United States Patent
Burnett

[15] 3,677,372
[45] July 18, 1972

[54] DISC BRAKE MOUNTING MEANS

[72] Inventor: Richard T. Burnett, South Bend, Ind.
[73] Assignee: The Bendix Corporation
[22] Filed: Sept. 29, 1970
[21] Appl. No.: 76,410

[52] U.S. Cl. ...................... 188/73.3, 188/73.5, 188/205 A, F16d/55/224
[58] Field of Search .................... 188/72.4, 73.3, 73.5, 205 A

[56] References Cited

UNITED STATES PATENTS

| 3,265,160 | 8/1966 | Elberg et al. | 188/73.6 |
| 3,388,774 | 6/1968 | Burnett | 188/73.5 |

FOREIGN PATENTS OR APPLICATIONS

| R86,481 | 1/1966 | France | 188/73.3 |

Primary Examiner—George E. A. Halvosa
Attorney—Ken C. Decker and Plante, Hartz, Smith and Thompson

[57] ABSTRACT

A disc brake is disclosed which includes a three-piece torque member. The inner portion of the torque member is mounted on the vehicle. A pair of allochiral outer members are secured to symmetrically opposite edges of the inner member. Each of the allochiral outer members are provided with recesses which slidably support a corresponding pin carried by the caliper of the brake. Spring members carried by each of the outer members yieldably maintain the pins in their corresponding recesses and also prevent the caliper from rattling. The brake assembly, including the outer members and spring members, can be assembled to or removed from the vehicle by assembling or removing one bolt through each of the outer members.

1 Claim, 5 Drawing Figures

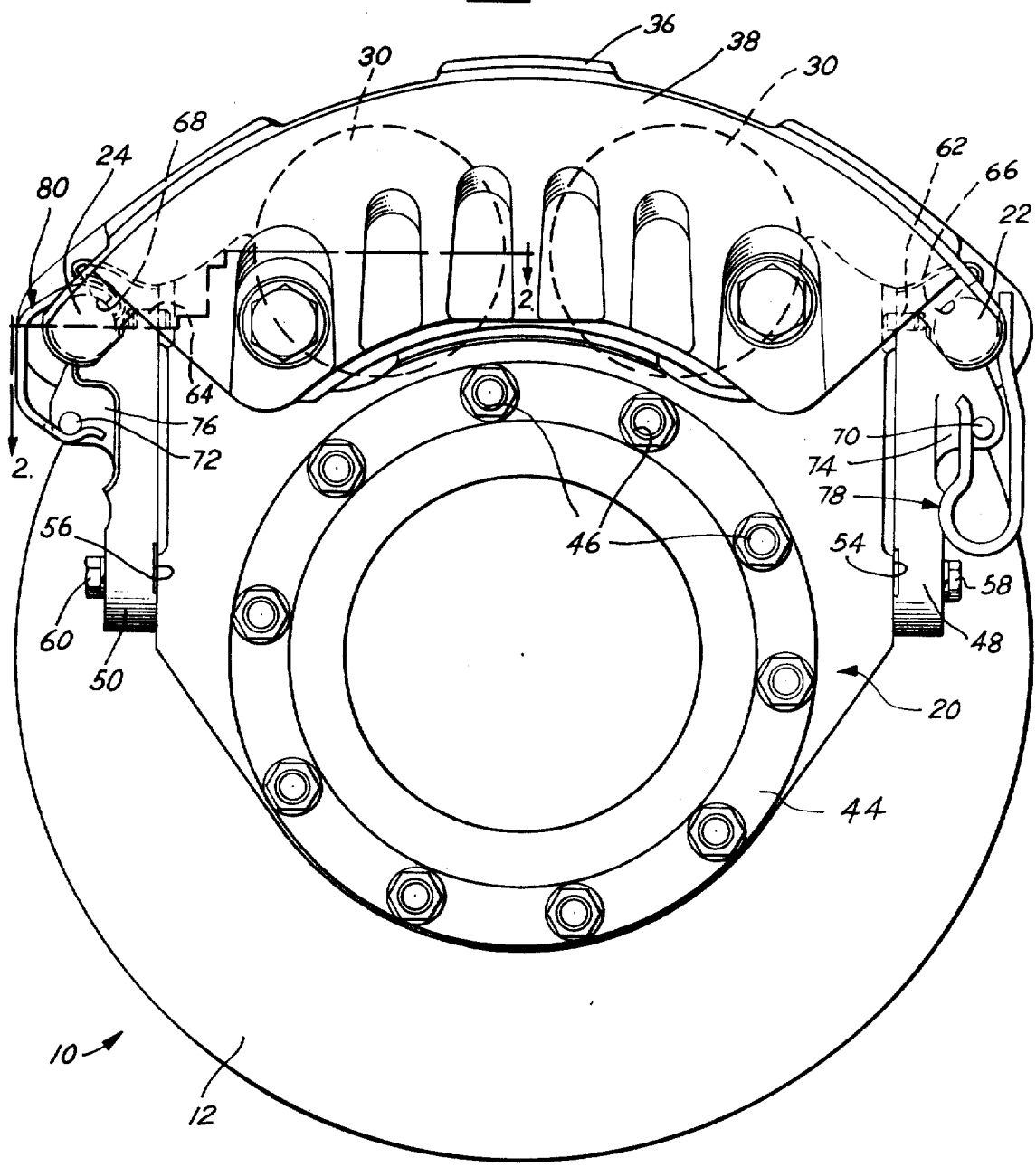

Patented July 18, 1972　　　　　　　　　　　　3,677,372
2 Sheets-Sheet 2
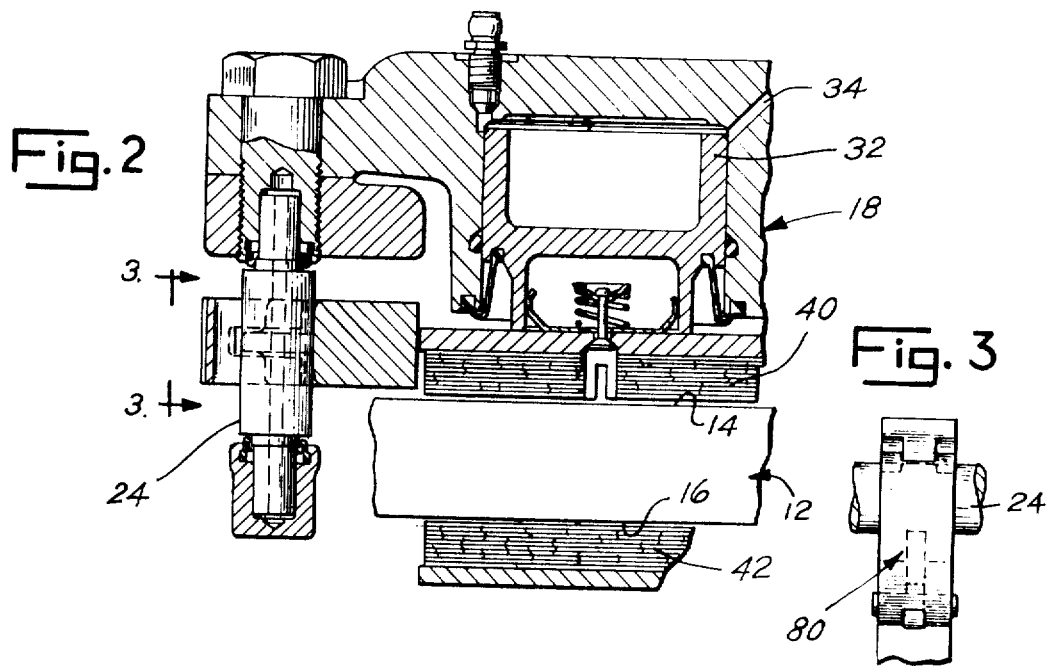
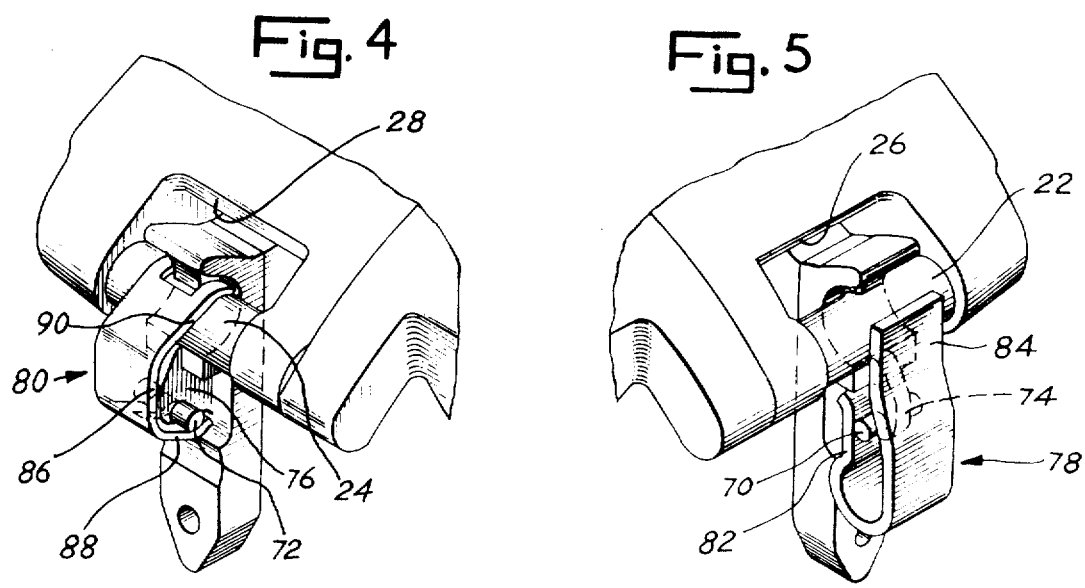
INVENTOR
RICHARD T. BURNETT
BY
Ken C. Decker
ATTORNEY

DISC BRAKE MOUNTING MEANS

BACKGROUND OF THE INVENTION

This invention relates to a disc brake.

Most existing disc brakes include a caliper which is slidably mounted on a torque member which is rigidly secured to the vehicle. The caliper is restrained on the torque member by a pair of resilient anti-rattle members. When the brake is disassembled for servicing, the anti-rattle members must be disassembled, which is a difficult and inconvenient procedure. Similarly, most brakes are manufactured at a location different from that where the vehicle is assembled and must be shipped to the final assembly point. The caliper and anti-rattle members must be assembled to the brake torque member when the vehicle is assembled, which is a time consuming and inconvenient process.

SUMMARY OF THE INVENTION

Therefore, an important object of my invention is to provide a disc brake in which the anti-rattle springs may be installed before the caliper is mounted on the vehicle.

Another important object of my invention is to simplify the design of anti-rattle springs used on disc brakes, thereby reducing their cost.

Another important object of my invention is to facilitate servicing of a disc brake.

A still further object of my invention is to enable a disc brake manufacturer to ship a complete brake assembly as a unit to a vehicle manufacturer.

DRAWING DESCRIPTION

FIG. 1 is a side elevation of a disc brake made pursuant to the teachings of my present invention;

FIG. 2 is a cross-sectional view taken along line 2—2 of FIG. 1;

FIG. 3 is a view taken along line 3—3 of FIG. 2;

FIG. 4 is a detailed perspective view illustrating the manner in which the caliper of my brake is attached to a portion of the torque member; and FIG. 5 is a detailed perspective view similar to FIG. 4 but illustrating the manner in which the caliper of my brake is attached to another portion of the torque member.

DETAILED DESCRIPTION

Referring now to the drawings, a disc brake indicated generally by the numeral 10 includes a rotor 12 having a pair of opposed friction faces 14 and 16. A caliper 18 is slidably mounted on a torque member 20 by a pair of pins 22, 24 carried by the caliper and extending across openings 26, 28 formed therein. The caliper 18 includes a portion disposed adjacent the friction face 14 which includes a housing defining a pair of chambers 30 therewithin. A pair of pistons (one of which is indicated by numeral 32) are slidably mounted in the chambers 30 for movement toward and away from the rotor 12 when pressurized fluid is admitted into the chambers 30 through the inlet port 34. The caliper 18 also includes a bridge portion 36 extending across the periphery of the rotor 12 and another portion 38 which extends radially inwardly from the bridge portion 36 generally parallel to the friction face 16. A friction element 40 is disposed between the piston 32 and the friction face 14, and another friction element 42 is disposed between the portion 38 and the friction face 16. As is clear to those skilled in the art, when a brake application is effected, high pressure fluid is admitted into the chambers 30 to force the pistons 32 toward the friction face 14. Movement of the pistons forces the friction element 40 against the friction face 14, and reaction forces acting through the bridge portion 36 urge the friction element 42 into engagement with the friction face 16.

The torque member 20 includes an inner member 44 which is secured to the vehicle axle flange by circumferentially spaced bolts 46 and a pair of allochiral outer members 48, 50 which are secured to symmetrically opposite edges 54, 56 of the torque member 20 by bolts 58, 60 and pins 62, 64. Each of the outer members 48, 50 are provided with outwardly facing arcuate recesses 66, 68 which slidably support a corresponding pin 22 or 24. Cylindrical members 70, 72 extend generally parallel to the axis of rotation of the rotor 12 and project through outwardly projecting bosses 74, 76 on the outer members 48 and 50.

A pair of resilient members 78, 80 carried by the outer members 48, 50 retain the caliper 18 on the torque member 20 and also prevent the caliper 18 from rattling. The resilient member 78 consists of a generally U-shaped body portion presenting a pair of arms 82, 84. The arm 82 is provided with a bifurcated end that fits around the boss 74 so that the arm 82 engages the cylindrical member 70. The arm 84 engages the side of the pin 22, so that the resiliency of the member 78 urges the pin 24 inwardly toward the friction elements. The other resilient member 80 includes a body portion 86 and a pair of arms 88, 90 extending from opposite ends of the body portion 86. Arm 88 terminates in a bifurcated and that embraces the boss 76 and engages the lower side of the cylindrical member 72. The arm 90 engages the upper surface of the pin 24, so that the resiliency of the member 80 urges the pin 24 downwardly into the recess 68, away from the portion 36 of the caliper that straddles the rotor.

When the brake 10 is manufactured, the pins 22, 24 are placed in their corresponding recesses 66 or 68 and the appropriate resilient members 78 or 80 are installed. The sub-assembly consisting of the caliper and the two allochiral members 48 and 50 are shipped to the vehicle manufacturer as a unit. The inner member 44 is shipped to the vehicle manufacturer as a separate unit. The vehicle manufacturer is then able to install the inner member 44 on the vehicle. The disc member, mounted on a hub (not shown), is then installed on the axle and then the caliper sub-assembly is installed over the disc on the member 44 by merely inserting the bolts 58, 60 in their appropriate places. In prior art devices, formerly, the caliper, the torque plate, the resilient members, the pin, nd the inner shoe had to be assembled when the brake was installed on the vehicle. This was a time-consuming and expensive process. Similarly, when the brake made pursuant to my invention is serviced, the mechanic may remove the caliper 18 by merely removing the bolts 58 and 60 and lifting the caliper 18 and outer members 48, 50 from the inner member 40. The mechanic can then replace the friction elements in the usual manner and replace the caliper sub-assembly on the inner member 44.

I claim:

1. In a disc brake:
   a rotor having a pair of friction faces;
   a pair of friction elements, one of said elements being disposed adjacent each of said friction faces;
   a caliper having a portion straddling said rotor for applying braking pressure to said friction elements to urge the latter into braking engagement with said friction faces;
   a torque member for supporting said caliper;
   said caliper including mounting means slidably mounting the latter on said torque member;
   said torque member being divided into three sections;
   one of said sections being adapted for attachment to a vehicle; and
   releasable retaining means joining each of the other sections to said one section;
   each of the other sections including supporting means cooperating with said mounting means to support the caliper for movement generally parallel to the axis of rotation of the rotor;
   said mounting means including a pair of pins extending generally parallel to the axis of rotation of said rotor;
   said supporting means including recesses in each of said other members slidably receiving said pins;
   resilient means yieldably retaining each of said pins in its corresponding recess;

said resilient means being a pair of spring members, one of said spring members being carried by each of said other sections;

the openings in said other sections defined by said arcuate recesses facing outwardly away from the corresponding outer edge of said one member;

each of said other sections having a cylindrical member extending therethrough generally parallel to the axis of rotation of the rotor;

one of said spring members having a generally U-shaped body presenting a pair of arms, one of said arms engaging said cylindrical members, the other arm engaging the side of the corresponding pin whereby the resiliency of said spring member urges said corresponding pin inwardly toward the corresponding outer edge of said one member;

the other of said spring members having a body portion with a pair of arms extending from opposite ends of the body portion, one of said arms engaging the other cylindrical member, the other arm engaging the upper surface of the corresponding pin whereby the resiliency of the spring member urges the corresponding pin in a direction generally parallel to the corresponding outer edge of said one member.

* * * * *